United States Patent [19]

Airheart et al.

[11] 4,004,661

[45] Jan. 25, 1977

[54] SPLIT BRAKE DISC

[75] Inventors: Franklin B. Airheart, Sylmar; Samuel J. Martins, Reseda, both of Calif.

[73] Assignee: Airheart Products, Inc., Chatsworth, Calif.

[22] Filed: May 12, 1975

[21] Appl. No.: 576,616

[52] U.S. Cl. .............. 188/218 XL; 192/107 R
[51] Int. Cl.[2] ........................ F16D 65/12
[58] Field of Search .......... 188/73.1, 73.2, 218 XL, 188/264 A, 264 AA; 192/107 R, 110 S, 113 A; 403/344

[56] References Cited

UNITED STATES PATENTS

| 2,553,828 | 5/1951 | McCune | 188/264 A |
| 3,314,509 | 4/1967 | Pelikan | 18/218 XL |
| 3,885,659 | 5/1975 | Smith | 188/218 XL |

FOREIGN PATENTS OR APPLICATIONS

| 1,048,935 | 12/1953 | France | 188/264 A |
| 1,103,375 | 3/1961 | Germany | 188/218 XL |
| 1,952,313 | 1/1971 | Germany | 188/218 XL |

Primary Examiner—George E. A. Halvosa
Assistant Examiner—Edward R. Kazenske
Attorney, Agent, or Firm—William W. Haefliger

[57] ABSTRACT

A braking disc is split into two arc-shaped body sections each having opposite faces for engagement with brake pads; and a retention device is located in the space between such faces for releasably retaining the sections in assembled relation.

5 Claims, 11 Drawing Figures

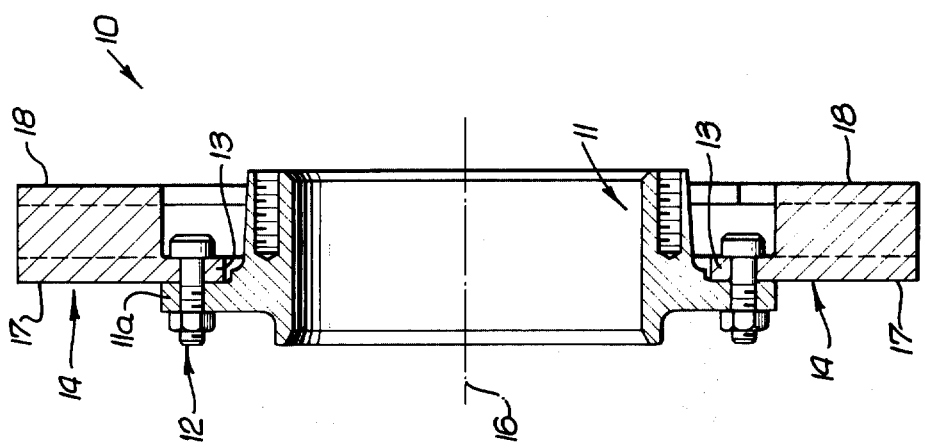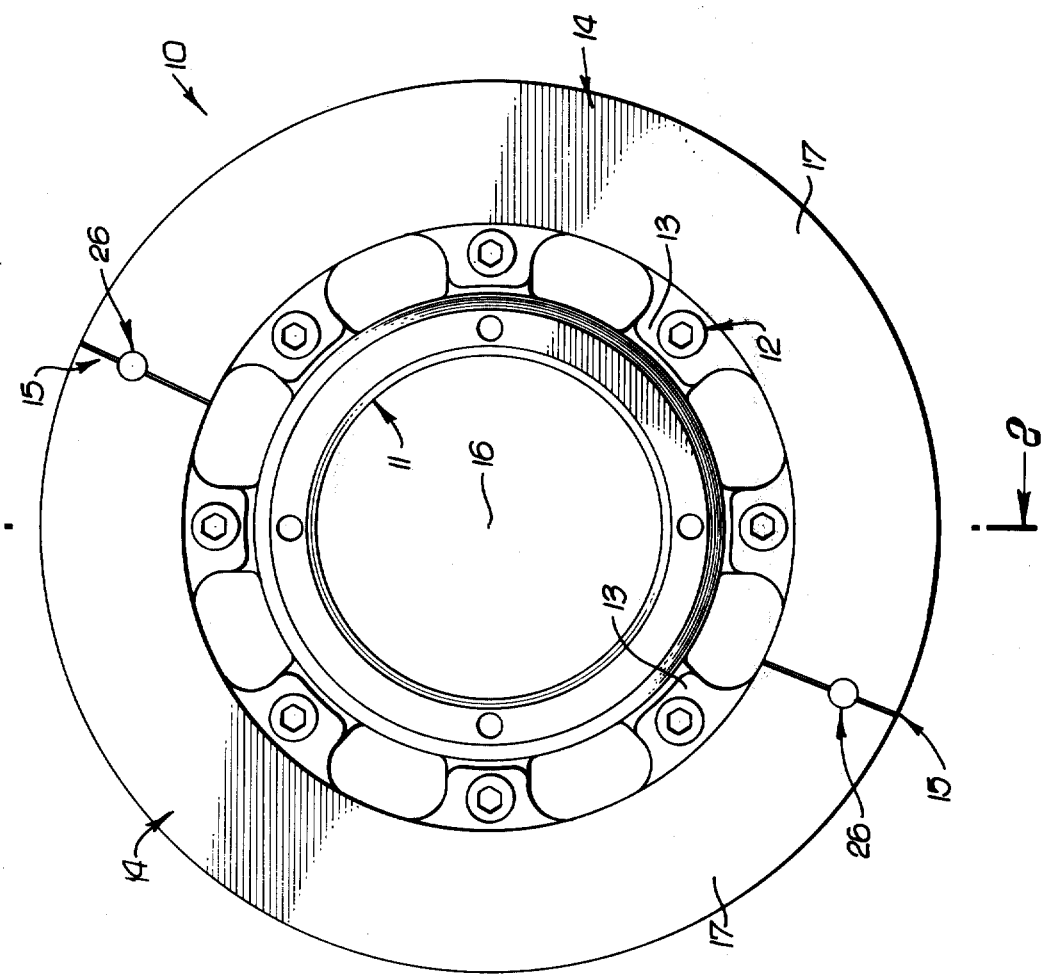

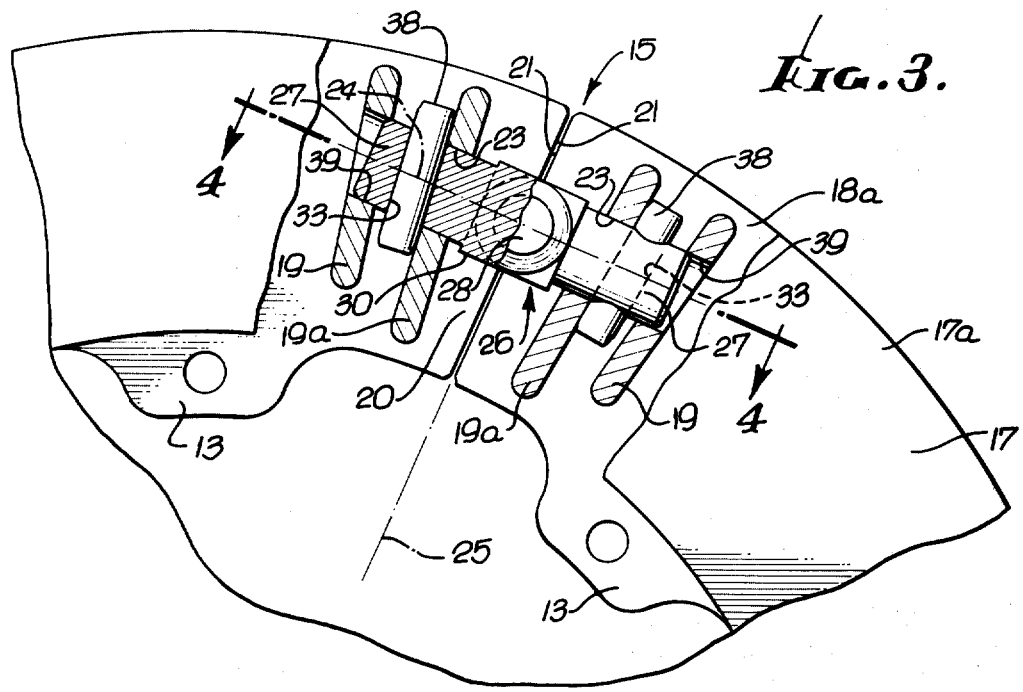
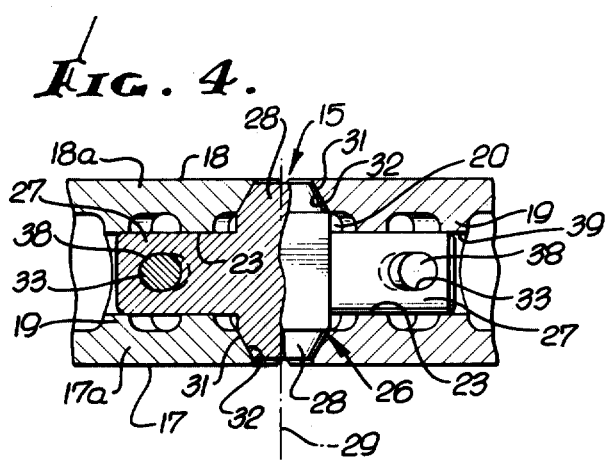
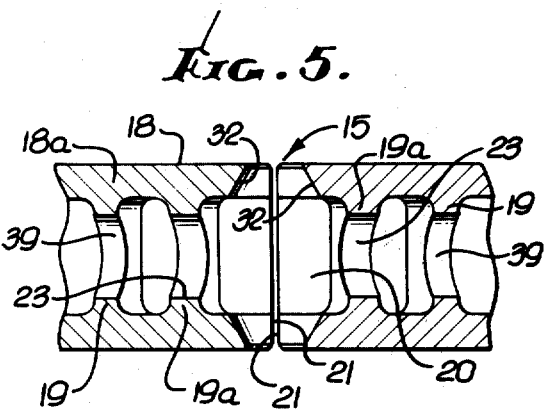
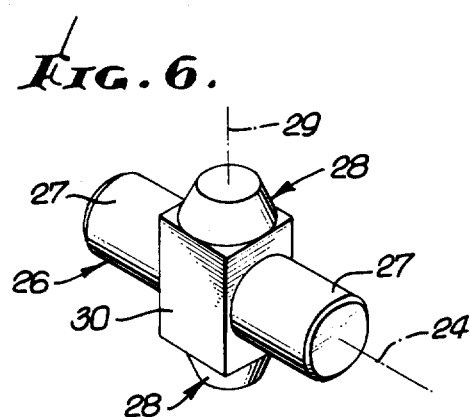
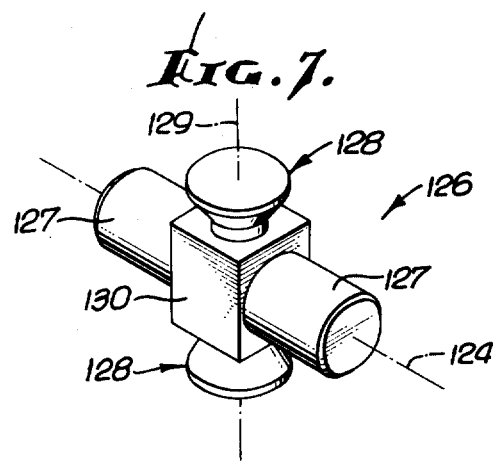

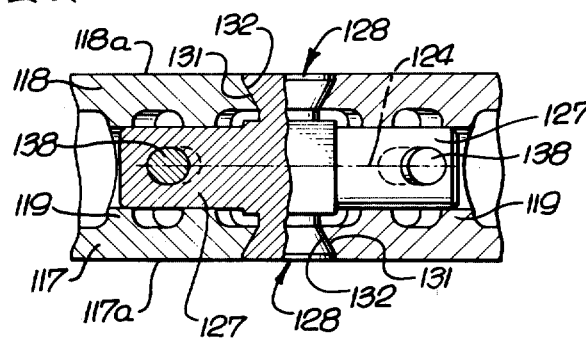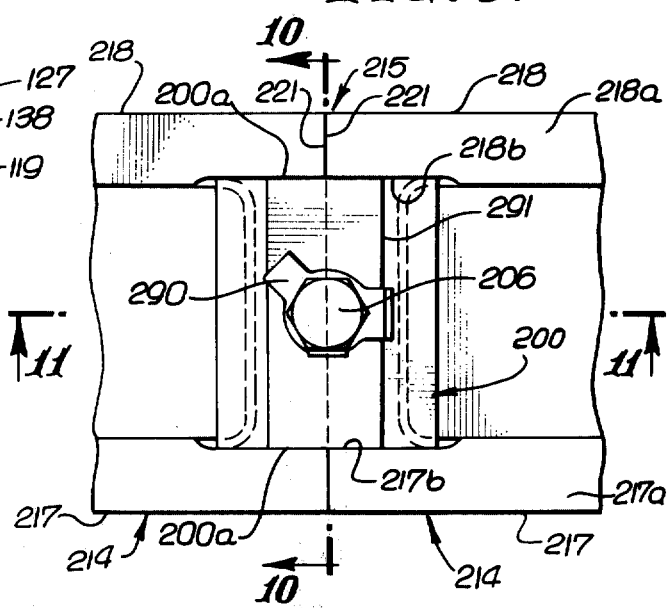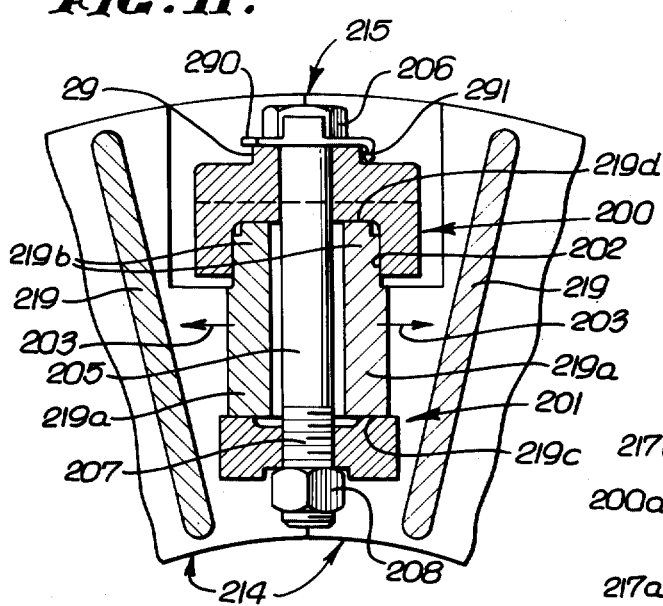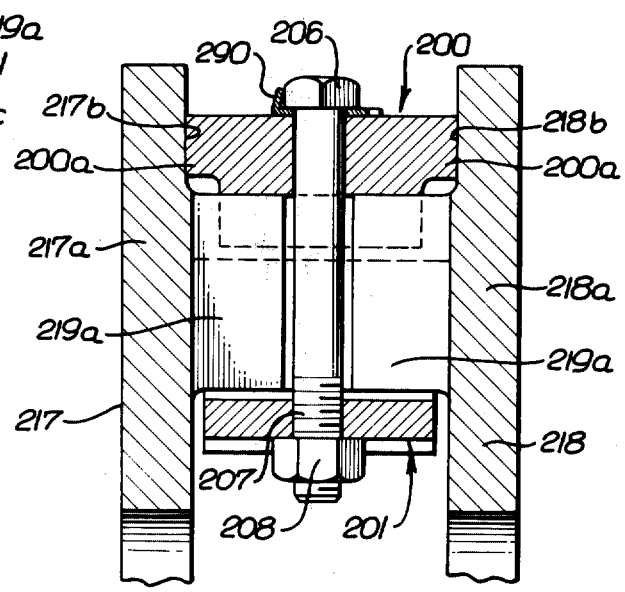

SPLIT BRAKE DISC

BACKGROUND OF THE INVENTION

This invention relates generally to disc brakes, and more particularly concerns split disc structure enabling quick removal and replacement of discs.

Conventionally, vehicle braking discs are located at the inner sides of vehicle wheels, whereby to gain access to such discs it is necessary to remove the wheels. In the case of rapid transit or railroad type installations, it is necessary to remove a wheel truck off the transit car, then remove an axle, propulsion gear and press the wheel off the axle in order to gain access to a single piece disc for its removal and replacement. All of the equipment must then be reassembled. Also, each time a wheel is pressed off an axle, it cannot be re-used on that axle due to loss of interference fit. It is readily seen that serious problems of down time and expense are involved in replacing worn or damaged discs.

SUMMARY OF THE INVENTION

It is a major object of the invention to provide a new type braking disc which avoids or overcomes the above problems. Basically, the invention concerns the provision of a disc split into at least two arc-shaped body sections each having opposite faces for engagement with brake pads; and retention means located in the space between such opposite faces for releasably retaining the sections in assembled relation to form an integrated circular or annular disc with its opposite faces maintained in two parallel planes; further, the sections typically include connecting means for attaching them to rotating structure such as a hub on an axle, whereby when such connections are released and the retention means is released, the sections may be easily separated and removed off the hub structure, followed by replacement with new disc sections.

As will appear, the sections typically include heat transfer ribs extending between plates which form the brake shoe engaging faces, and the retention means comprises a retainer bridging two of the ribs respectively integral with adjacent section terminals, the retainer located between such plates. In one form of the invention the retainer includes stub shafts that extend through openings drilled into such ribs, and studs projecting from the retainer engage frusto-conical surfaces on the opposite plates to accurately align such plates so that the faces of the plates extend in parallel planes and do not project out of such planes. Pins driven into openings in the stub shafts and engaging the two ribs create a wedging action tending to hold the studs in engagement with the plates, as described.

In another form of the invention, the ribs are bridged by a retainer element, and a fastener holds that element in position with its outer edges in engagement with inner faces of the plates, whereby the outer faces of the latter are accurately aligned, as will be seen.

These and other objects and advantages of the invention, as well as the details of illustrative embodiments, will be more fully understood from the following description and drawings, in which:

DRAWING DESCRIPTION

FIG. 1 is a side elevation showing a brake disc assembly embodying the invention;

FIG. 2 is a section taken on lines 2—2 of FIG. 1;

FIG. 3 is an enlarged fragmentary elevation, partly broken away to show retention of disc body sections;

FIG. 4 is a section on lines 4—4 of FIG. 3;

FIG. 5 is a view like FIG. 4, but without the retainer that retains the section in FIG. 4;

FIG. 6 is a perspective showing of the retainer seen in FIGS. 3 and 4;

FIG. 7 is a perspective showing of a modified retainer;

FIG. 8 is a view like FIG. 4, and showing an installation employing the FIG. 7 retainer;

FIG. 9 is a view like FIG. 4 showing an installation employing still another type retainer;

FIG. 10 is a section on lines 10—10 of FIG. 9; and

FIG. 11 is a section on lines 11—11 of FIG. 9.

DETAILED DESCRIPTION

As referred to, the braking disc assembly, an example of which is indicated at 10 in FIGS. 1 and 2 is attachable to rotating structure such as the vehicle hub 11. In the example, bolts 12 join tabs 13 on two like disc body sections 14 to a flange 11a on hub, the tabs 13 serving as connecting means for the sections.

The two sections 14 are arc-shaped, and preferably semi-circular so that joints 15 therebetween are diametrically opposed with respect to axis 16. The disc body sections have opposite faces at 17 and 18 for engagement with brake pads, such faces typically being formed by metallic plates 17a and 18a which are interconnected as by metallic cooling ribs 19 which extend generally radially and are circularly spaced apart. Plates 17a and 18a are parallel and spaced apart, axially.

In accordance with the invention, retention means is provided between the opposite faces 17 and 18, and preferably in the space 20 between plates 17a and 18a for releasably retaining the sections 14 in assembled relation. The construction is such that sections are joined to form a circular disc with the faces 17 and 18 of the sections maintained in two parallel planes. In this regard, the sections have adjacent terminals at both joints 15, such terminals indicated at 21 in FIG. 3; further, the retention means preferably bridges each joint and has releasable connection with certain ribs such as are indicated at 19a as being proximate the joint 15.

Ribs 19a at opposite sides of the joint 15 contain circumferentially spaced drilled openings 23, the common axis 24 of which lies perpendicular to a radius line to joint 15 and indicated at 25. The retention means in this embodiment comprises a retainer 26 having circumferentially projecting, circular cross-section stub shafts 27 releasably retained in the openings 23. The retainer also includes at least one, and preferably two studs 28 defining an axis 29 normal to axis 24 and normal to radius line 25. The studs and stub shafts typically project oppositely from a central rectangular block 30, as better seen in FIG. 6.

It will be seen in FIG. 4 that the studs and body section terminals define interengaged frusto-conical surfaces acting to position the plates 17a and 18a, and to hold the section faces 17 in a one plane and the section faces 18 in a second plane. For example, the stud frusto-conical surfaces 31 engage the section frusto-conical surfaces 32, as shown. Note that an approximately semi-circular portion of each surface 32 is formed by each of the plates 18a and also by each of the plates 17a. Such interengagement to position the faces 17 and 18 as described is effected by means tending to urge the section terminals 21 toward one another. In this regard, the stub shafts 27 typically contain generally radially extending openings 33 which are drilled through these shafts. The retention means includes pins 38 driven into these openings, the pins also engaging certain ribs, i.e. ribs 19a, as shown. Accordingly, a wedging action is created to clamp the frusto-conical surfaces 32 against the stud frusto-conical surfaces 31, whereby the precise alignment of faces 17 and 18, as described, is achieved. The interengagement of surfaces 31 and 32 also provides for minimal stress resulting from expansion due to heating upon dissipation of kinetic energy of braking. Ribs 19 may also contain drilled openings 39, as shown, to receive end extents of shafts 27.

When it is required to replace a worn or damaged brake disc, it is only necessary to remove pins 38 from openings 37 and to remove bolts 12. It is then possible to separate the two disc sections 17 and 18 in opposite directions parallel to retainer axis 24, whereby the sections 17 and 18 are removed and can be replaced without requiring removal of a wheel, axle or propulsion gear associated with hub 11.

Referring to FIGS. 7 and 8, they show a slightly modified retainer 126 having stub shafts 127 and studs 128 integral with central block 130 similar to corresponding components in FIG. 6. The connection of the stub-shafts to the ribs 119 of the disc body sections 117 and 118, as by means of pins 138, corresponds to that described in FIGS. 1–6. The studs 128, on the other hand, have frusto-conical surfaces 131 which taper toward stub shaft axis 124 rather than away from that axis as in FIG. 6. Likewise, the frusto-conical surfaces 132 on plates 118a and 117a taper toward axis 124.

Referring now to FIGS. 9–11, two like disc body sections 214 have adjacent abutting terminals 221 defining a joint 215 therebetween, in the manner of sections 14 previously described. The sections include plates 217a and 218a defining faces 217 and 218 similar to faces 17 and 18. Ribs 219 interconnect the annular plates and are circularly spaced about the disc axis to dissipate heat generated by the friction braking operation.

In this embodiment the retention means releasably retaining the sections 214 in assembled relation comprises elements as at 200 and 201 at radially opposite ends of certain ribs 219a closest to the joint 215, ribs 219a also extending radially. Element 200 forms a recess 202 closely receiving outer end portions 219b of the ribs 219a, whereby the ribs are prevented from separating in the directions 203, i.e. the sections 214 are held in assembled relation at the joint 215. Element 201 abuts the inner ends 219c of the ribs, as shown.

The retention means also includes a fastener 205 extending radially between ribs 219a, and holding the elements 200 and 201 to the ends 219d and 219c of the ribs, as shown. The illustrated fastener comprises a bolt having a head 206 and a threaded end 207 to which nut 208 is applied and tightened against element 201.

Element 200 has side shoulders 200a closely fitting or engaging the inner faces or sides 217b and 218b of the plates 217a and 218a, whereby the disc outer faces 217 are accurately maintained in one plane, and the disc outer faces 218 are also accurately maintained in one plane. A lock bracket 290 fits over head 206 and against shoulder 291 of the element 200 to prevent rotation of the head 206.

We claim:
1. A braking disc assembly connectible to rotating structure, comprising
   a. multiple arc shaped disc body sections having opposite faces for engagement with brake pads,
   b. and retention means between said opposite faces for releasably retaining said sections in assembled relation to form an integrated disc with said faces maintained in two parallel planes,
   c. said sections including connecting means for attaching the sections to said rotating structure, said sections being semi-circular, the sections including parallel plates defining said opposite faces and defining a space therebetween, and a plurality of generally radially extending ribs integral with said plates and located in the space therebetween, said retention means being entirely located in said space and between radially inner and outer limits of said opposite faces of said body sections, the sections having adjacent abutting terminal ends forming a joint between said sections and to which said faces extend, and said retention means including separate radially spaced inner and outer retainers each bridging said joint and being releasably connected to one of said ribs on each side of said joint, the retention means further including a threaded fastener shaft extending between said connected ribs to hold said retainers in position, and at least one of the retainers telescopically interfitting portions of said connected ribs.

2. The assembly of claim 1 wherein both the retainers bridge said connected ribs.

3. The assembly of claim 2 wherein said fastener shaft extends generally radially between said connected ribs.

4. The assembly of claim 1 wherein at least one of said retainers has shoulders in engagement with inner faces defined by said plates.

5. The assembly of claim 1 wherein the retainers are located at radially opposite ends of said connected ribs.

* * * * *